United States Patent
Zhu et al.

(10) Patent No.: US 9,118,192 B2
(45) Date of Patent: Aug. 25, 2015

(54) SERIES/PARALLEL CONNECTION SCHEME FOR ENERGY STORAGE DEVICES

(75) Inventors: Li-Yan Zhu, San Jose, CA (US); Jei Wei Chang, Cupertino, CA (US); Ping Hua Deng, Guangdong (CN)

(73) Assignee: Amperex Technology Limited, Hong Kong (CN)

( * ) Notice: Subject to any disclaimer, the term of this patent is extended or adjusted under 35 U.S.C. 154(b) by 432 days.

(21) Appl. No.: 13/199,440

(22) Filed: Aug. 29, 2011

(65) Prior Publication Data

US 2013/0049696 A1 Feb. 28, 2013

(51) Int. Cl.
*H02J 7/00* (2006.01)
*H01M 10/42* (2006.01)

(52) U.S. Cl.
CPC ............ *H02J 7/0026* (2013.01); *H02J 7/0029* (2013.01); *H01M 10/4207* (2013.01); *H02J 2007/0039* (2013.01)

(58) Field of Classification Search
USPC .......................................................... 320/134
See application file for complete search history.

(56) References Cited

U.S. PATENT DOCUMENTS

| | | |
|---|---|---|
| 3,686,530 A | 8/1972 | Bogut |
| 4,935,315 A | 6/1990 | Herrin |
| 5,227,259 A | 7/1993 | Weaver et al. |
| 5,898,291 A * | 4/1999 | Hall .............................. 320/121 |
| 6,331,763 B1 | 12/2001 | Thomas et al. |
| 6,977,480 B2 * | 12/2005 | Emori et al. ................... 320/104 |
| 7,075,194 B2 | 7/2006 | Weidenheimer et al. |
| 7,456,521 B2 | 11/2008 | Weidenheimer et al. |
| 7,737,580 B2 | 6/2010 | Hjort et al. |
| 7,893,561 B2 | 2/2011 | Weidenheimer et al. |
| 8,237,409 B2 * | 8/2012 | Jang .............................. 320/134 |
| 8,350,413 B1 * | 1/2013 | Tsukamoto ..................... 307/71 |

(Continued)

FOREIGN PATENT DOCUMENTS

| | | |
|---|---|---|
| JP | 2004 031268 | 1/2004 |
| WO | WO 2011003924 A1 * | 1/2011 |
| WO | WO 2011029702 A2 * | 3/2011 |
| WO | WO 2011/092043 | 8/2011 |

OTHER PUBLICATIONS

PCT Search Report PCT/CN2012/080129 Mail date—Nov. 29, 2012, Amperex Technology Ltd.

(Continued)

*Primary Examiner* — Richard Isla Rodas
*Assistant Examiner* — David V Henze-Gongola
(74) *Attorney, Agent, or Firm* — Saile Ackerman LLC; Stephen B. Ackerman

(57) ABSTRACT

A battery pack has series-parallel connected battery cells. An inrush current limiting circuit has current limiting devices and a current limiting tracking means limits inrush current from shorted battery cells. Each current limiting tracking means is coupled to the current limiting devices such that they limit an inrush current from parallel neighbor battery cells when one battery cell on the column shorts. The current limiting devices are variable buffer resistors with a positive temperature coefficient. The current limiting tracking means are heat sinks that thermally couples the buffer resistors together such that the buffer resistors increase in resistance with a temperature increase caused by current flowing through the buffer resistor associated with the shorted battery cell. Current regulating elements are in series with columns of battery cells for preventing inrush current to the columns of the battery cells.

32 Claims, 4 Drawing Sheets

(56) References Cited

U.S. PATENT DOCUMENTS

| | | | |
|---|---|---|---|
| 2005/0057221 A1* | 3/2005 | Desilvestro et al. | 320/119 |
| 2005/0258805 A1* | 11/2005 | Thomas et al. | 320/134 |
| 2009/0066291 A1 | 3/2009 | Tien et al. | |
| 2010/0291426 A1 | 11/2010 | Zhou | |
| 2011/0003182 A1 | 1/2011 | Zhu | |
| 2011/0305925 A1* | 12/2011 | Ro | 429/7 |
| 2012/0119704 A1* | 5/2012 | Beranger et al. | 320/117 |
| 2012/0161710 A1* | 6/2012 | Mai et al. | 320/118 |
| 2012/0249076 A1 | 10/2012 | Birke et al. | |

OTHER PUBLICATIONS

"PTC Thermistors," sales brochure, 6 pages, Found: http://www.thermometrics.com/assets/images/ptcnotes.pdf.
Bowthorpe Thermometrics, Somerset TA2 8QY, UK, Thermometrics, Inc., Edison, NJ, USA.
Keystone Thermometrics Corporation, St. Marys, PA, USA.
European Search Report 12827579.9-1804/2751867, Mar. 31, 2015.

* cited by examiner

SERIES/PARALLEL CONNECTION SCHEME FOR ENERGY STORAGE DEVICES

RELATED PATENT APPLICATIONS

U.S. patent application Ser. No. 12/459,654, filed on Jul. 6, 2009 assigned to the same assignee as the present invention, and incorporated herein by reference in its entirety.

BACKGROUND OF THE INVENTION

1. Field of the Invention

This invention relates to batteries, in particular to large capacity secondary batteries comprising multiple cells arranged in a series-parallel structure. More particular this invention relates to multiple cell batteries having current limiting devices to protect the batteries during a cell shorting event.

2. Description of Related Art

In order to achieve desired voltage and capacity, a battery often consists of many cells. A conventional series-parallel scheme is characterized by connecting a string of cells in series together, then connecting multiple of strings in parallel. A conventional parallel-series scheme is characterized by connecting a bank of cells in parallel, then connecting a plurality of banks in series.

As known in elementary physics, cells (or strings of cells) connected in parallel tend to achieve and maintain identical voltages. The spontaneous voltage equalization within a bank simplifies voltage monitor and control processes during normal usage. But it is dangerous in case one of the cells (or strings of cells) develops an internal short. For brevity the cell (or string of cells) containing the short will be called a shorted cell (or shorted string of cells). Other cells (or strings of cells) in the bank or row will be called parallel neighbors. The shorted cell (or string of cells) receives energy from its parallel neighbors, through a spontaneous inrush current, and become more likely to overheat.

In a parallel-series battery structure, multiple banks are connected in series. Inrush current is primarily circling around the bank harboring the short. In a series-parallel scheme, there is only one bank of strings. Inrush current loops around the entire battery. Loop resistance is greater in a series-parallel battery structure than in a parallel-series structure. Thus the inrush current is smaller in a series-parallel structure than in a parallel-series structure. As a result, a shorted cell is less likely to overheat in a series-parallel battery structure than in a parallel-series battery structure. In other words, a series-parallel structure is more robust against internal short, thus safer than a parallel-series structure.

However in normal usage, each string of the series-parallel battery structure needs to be monitored and balanced independently, whereas the parallel-series battery structure can be monitored and balanced as a single string. Thus a series-parallel structure requires more battery management units (BMU) than a parallel-series structure. This economical consideration has lead to popularity of parallel-series scheme over series-parallel scheme, at the expense of safety.

SUMMARY OF THE INVENTION

It is an objective of the present invention to provide a matrix of series-parallel connected battery cells with intra-row isolation such that inrush current is reduced when a cell or string of cells experiences an internal short.

To accomplish at least this objective, a battery pack has a matrix of series-parallel battery cells. The battery pack has an inrush current limiting circuit to prevent current from a shorted battery cell from damaging other battery cells. The series-parallel connected battery cells or battery cells strings are arranged in rows and columns such that in each column, the battery cells are series connected such that each battery cell in the column has a positive node connected to form a junction with a negative node of an adjacent battery cell. A positive node of a first battery cell of each column of battery cells is connected to a positive output connector of the battery pack and a negative node of a last battery cell of each column of battery cells is connected to a negative connector of the battery pack.

Each of the buffer resistors has a first terminal coupled to one junction of the positive node of one of the battery cell or string of cells in a column with the negative node of the adjacent battery of the column. A second terminal of the buffer resistors connected to the junctions a row of the battery cell or string of cells is connected together and to a measurement node connector of a battery management system. Each of the buffer resistors are variable resistors that will increase resistance when one or more battery cell or string of cells short to prevent excess current from damaging other batteries in the battery pack.

In some embodiments, each of the buffer resistors has a positive temperature coefficient such that as a temperature increases within the buffer resistor the resistance of the buffer resistor increases. In other embodiments, each of the buffer resistors is a fuse that destructs when one battery cell or string fails.

In various embodiments, the buffer resistors connected to the battery cells or string of cells of each column are thermally coupled such that the resistance of the buffer resistors is varied synchronously. In various embodiments, the buffer resistors are joined to a heat sink and have an electrical insulator providing electrical isolation of the buffer resistors from the heat sink. The heat sink is copper, aluminum, tin, lead or other heat conducting material. To insure uniform heating of the buffer resistors, the buffer resistors are surrounded or nearly surrounded by the heat sink to thermally isolate the buffer resistors from the ambient temperature. The electrical insulator similarly surrounding the buffer resistors to insure electrical isolation between the buffer resistors and the heat sink.

In some embodiments, each column of the battery cells have a current regulating element placed in series with the string of the battery cells to prevent overcharging or over-discharging of the battery cells in the event of a shorted battery cell. In various embodiments, the current regulating element and the buffer resistors for each cell of this column are thermally coupled to equalize the resistance of the buffer resistors. In various embodiments, the current regulating element is a resistor with a positive temperature coefficient to spontaneously equalize the current to suppress inrush current in each of the rows of the battery cells.

In various embodiments, the buffer resistors and the current regulating element are thermally isolated from the ambient environment. In some embodiments, an assembly of thermally coupled buffer resistors and the current regulating element are surrounded with a thermal insulator to thermally isolate the buffer resistors and current regulating element from the ambient temperature.

In other embodiments an inrush current regulating assembly has multiple positive temperature coefficient buffer resistors coupled to the junctions of a row of series connected battery cells in a matrix of series-parallel connected battery cells. The positive temperature coefficient buffer resistors are thermally coupled and electrically isolated. In some embodiments, the positive temperature coefficient buffer resistors are affixed to a heat sink with an electrical insulator placed between the positive temperature coefficient buffer resistors and the heat sink. The heat sink is copper, aluminum, tin, lead or other heat conducting material. To insure uniform heating of the buffer resistors, the buffer resistors are surrounded or nearly surrounded by the heat sink to thermally isolate the buffer resistors from the ambient temperature. The electrical insulator similarly surrounding the buffer resistors to insure electrical isolation between the buffer resistors and the heat sink.

In some embodiments, the inrush current regulating assembly has a current regulating element in series with each column of the battery cells. The current regulating element is, in various embodiments, a positive temperature coefficient buffer resistor. The current regulating element is thermally coupled to and electrically isolated from the buffer resistors of the column of the battery cells that is series with the current regulating element. In various embodiments, the current regulating element is a resistor with a positive temperature coefficient to spontaneously equalize the current to suppress inrush current in each of the rows of the battery cells.

DETAILED DESCRIPTION OF THE INVENTION

U.S. Patent Publication 2011/0003182 A1 (Zhu) describes a hybrid battery pack that combines the safety of series-parallel and economy of parallel-series schemes. The structure is a modified series-parallel scheme, in which any connection between two serially connected cells is called a junction. Each junction on the same row, i.e., at the same nominal potential, is coupled through a buffer resistor to a common node. A battery management unit (BMU) monitors electrical potential of each node, and potentials of the battery terminals. Alternately, the structure may also be viewed as a modified parallel-series scheme, in which parallel connections within each bank of cells have non-negligible resistance.

In a conventional series-parallel scheme, voltage of cells on the same row tends to diverge, at a time-constant in the order of months. In a conventional parallel-series scheme, the time-constant of harmful inrush current during internal short is in the order of seconds. In the structure described in Zhu, the resistance of buffer resistors is selected so that the time-constant of spontaneous intra-bank voltage equalization is intermediate of two time-constants mentioned above. Thus the hazard of inrush current is reduced and the need for independent monitor and balancing for each string of battery cells is eliminated.

In addition to internal short and intra-bank equalization, optimization of the buffer resistance is subject to additional considerations. For example, cells in a same string may possess different capacities. A lower buffer resistance allows more operating (charge/discharge) current to bypass a cell of lower capacity, thus avoiding overloading and premature degradation of this cell.

In another consideration, inrush current in a series-parallel scheme may overcharge good cells on a shorted string, and over-discharge cells on parallel neighbor strings of battery cells. Similar damages may occur in the structure describe in Zhu, if the buffer resistance is too large. As an illustrative example, when a battery cell is shorted and its buffer resistor is too large, the battery cells resident on the parallel neighbor columns together may overcharge the remaining cells on the column of battery cell having the shorted battery cell. The battery cells on the parallel neighbor columns not having the shorted batter cells may over-discharge themselves. Given these additional considerations, the buffer resistance becomes more difficult to optimize.

To compensate for the overcharging and over-discharging of the battery cells, a current limiting device replaces the buffer resistors of Zhu to limit the inrush current during a battery cell shorting event. In various embodiments, the current limiting devices are variable buffer resistors that increase their resistance when the current through them exceeds a certain amount. In some embodiments, the variable buffer resistors have a positive temperature coefficient.

Figure 1:
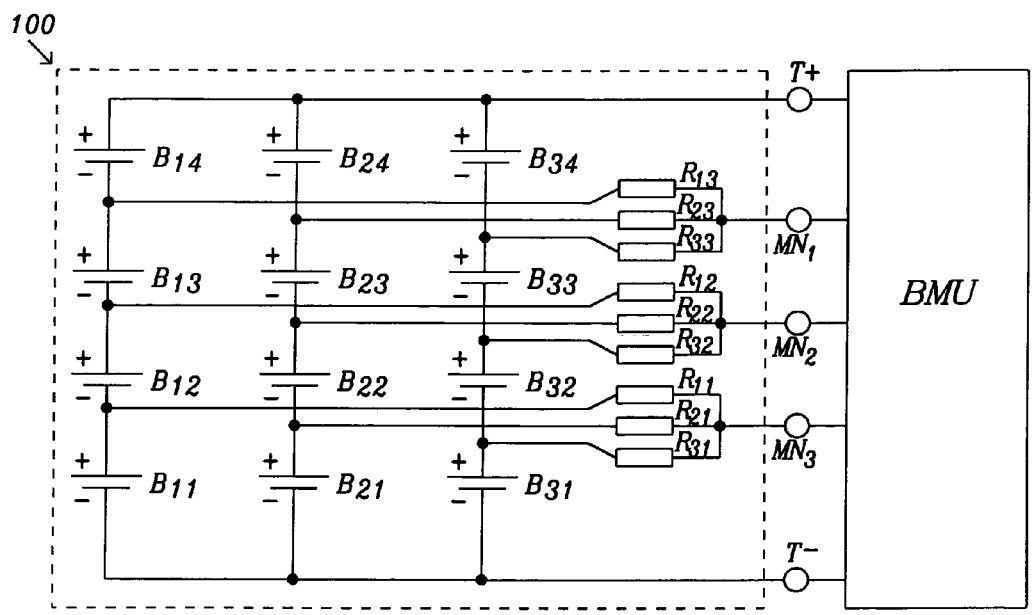
FIG. 1 is a schematic diagram of a series-parallel battery pack with measurement nodes shared by multiple columns of series of batteries embodying the principles of the present invention.

FIG. 1 is a schematic diagram of a series-parallel battery pack 100 with measurement nodes $MN_1$, $MN_2$, and $MN_3$ shared by multiple columns of series connected batteries $B_{11}$, $B_{12}$, ..., $B_{33}$, $B_{34}$ embodying the principles of the present invention. The batteries $B_{11}$, $B_{12}$, ..., $B_{33}$, $B_{34}$ are arranged in rows and columns where the batteries $B_{11}$, $B_{12}$, ..., $B_{33}$, $B_{44}$ of each column are connected in series with the positive terminals of first batteries of each series $B_{14}$, $B_{24}$, and $B_{34}$ being connected to a positive terminal $T^+$ of the battery pack 100. The negative terminal of a last batteries of each series $B_{11}$, $B_{21}$, and $B_3$, being connected to the negative terminal $T^-$ of the battery pack 100. The batteries $B_{11}$, $B_{12}$, ..., $B_{32}$, $B_{33}$ resident on each column have their positive terminals connected to the negative terminal of the adjacent battery $B_{12}$, $B_{13}$, ..., $B_{33}$, $B_{34}$. It should be noted that although FIG. 1 shows three columns of four serial connected batteries $B_{11}$, $B_{12}$, ..., $B_{33}$, $B_{34}$, a more general configuration has any number m of columns of any number n of serially connected batteries $B_{11}$, $B_{12}$, ..., $B_{m(n-1)}$, $B_{mn}$, is within the scope and intent of the present invention. Further the batteries $B_{11}$, $B_{12}$, ..., $B_{33}$, $B_{34}$ are shown as single cells, however having multiple cells serially connected as a string, or connected in parallel as a bank, or connected by a combination of series and parallel connections as an array embodies the principles of the present invention.

The battery pack 100 has multiple current limiting devices that are implemented as variable buffer resistors $R_{11}$, $R_{12}$, ..., $R_{32}$, $R_{33}$. Each of the variable buffer resistors $R_{11}$, $R_{12}, \ldots, R_{32}, R_{33}$ has a first terminal coupled to one junction of the positive node of one of the batteries $B_{11}, B_{12}, \ldots, B_{32}, B_{33}$ in a column with the negative node of the adjacent battery $B_{12}, B_{13}, \ldots, B_{33}, B_{34}$ of the column. The second terminals of the variable buffer resistors $R_{11}, R_{12}, \ldots, R_{32}, R_{33}$ that are connected to the junctions a row of batteries $B_{11}, B_{12}, \ldots, B_{32}, B_{33}$ are connected together and to the measurement nodes $MN_1$, $MN_2$, and $MN_3$. The measurement nodes $MN_1$, $MN_2$, and $MN_3$ are the input terminals for of a battery management unit BMU. The battery management unit BMU monitors and balances voltage between successive measurement nodes, $MN_1$, $MN_2$, $MN_3$, and the positive terminal $T^+$ and the negative terminal $T^-$ of the battery pack 100 (i.e., the voltage of each row of the batteries $B_{11}, B_{12}, \ldots, B_{33}, B_{34}$). It is known in the prior art that a battery management unit BMU typically contains a multiplexer (not shown), which allows multiple rows to be monitored successively, using a single analog to digital (ND) converter. The battery management unit BMU may also establish a shunt path to drain rows of the batteries $B_{11}, B_{12}, \ldots, B_{33}, B_{34}$ of excess charge, or transfer the excess charge to rows of the batteries $B_{11}, B_{12}, \ldots, B_{33}, B_{34}$ that are deficient in charge.

Each of the variable buffer resistors $R_{11}, R_{12}, \ldots, R_{32}, R_{33}$ will increase resistance when one or more battery cell or string of cells short to prevent excess current from damaging other batteries in the battery pack.

In various embodiments, the variable buffer resistors $R_{11}, R_{12}, \ldots, R_{32}, R_{33}$ are positive temperature-coefficient (PTC) devices. The variable buffer resistors $R_{11}, R_{12}, \ldots, R_{32}, R_{33}$ have a low resistance under normal operating and storage conditions, but the resistance increases automatically when a serious internal short occurs. The excessive inrush current heats the positive temperature coefficient variable buffer resistors $R_{11}, R_{12}, \ldots, R_{32}, R_{33}$ whose resistance increases with the heat transferred directly from the shorted cells or due to the heat generated as result of the inrush current. The positive temperature coefficient resistors are known in the art and are used as a standard safety device in cylindrical lithium-ion energy cells. The positive temperature coefficient variable buffer resistors $R_{11}, R_{12}, \ldots, R_{32}, R_{33}$ do not carry normal operating current, thus neither dissipating energy nor generating heat. The positive temperature coefficient variable buffer resistors $R_{11}, R_{12}, \ldots, R_{32}, R_{33}$ differ from that used in conventional cells. The positive temperature coefficient resistors of the cylindrical lithium-ion energy cells of the prior art are annular (resembling a gasket). The positive temperature coefficient variable buffer resistors $R_{11}, R_{12}, \ldots, R_{32}, R_{33}$ are, in various embodiments, a strip of positive temperature coefficient resistive material similar to that in the automobile rear window-defroster. The positive temperature coefficient resistive material may be made of barium titanate ceramics, or graphite and cristobalite-type $SiO_2$ composite.

In other embodiments, the variable buffer resistors $R_{11}, R_{12}, \ldots, R_{32}, R_{33}$ are fuses. The resistance of the fuses is negligible under normal circumstances, and becomes infinitely large after a serious internal short. In various embodiments, the fuse is able to be reset. A resettable fuse is commonly referred to as a thermal cut off unit and is more expensive. The thermal cut off unit, however, reduces the effort of servicing blown fuses.

In various embodiments, fixed buffer resistors $R_{11}, R_{12}, \ldots, R_{32}, R_{33}$ as described in Zhu, positive temperature coefficient variable buffer resistors $R_{11}, R_{12}, \ldots, R_{32}, R_{33}$, and fuses are coupled in a variety of series and/or parallel combinations, to achieve desired variable resistance under diverse conditions. In general, the object is to achieve low buffer resistance during normal operations, to emulate a parallel-series is battery pack structure for the ease of management while achieving high buffer resistance when an internal short occurs to achieve a series-parallel battery pack structure for safety.

In the above described embodiments, sporadic increases of the resistance of the any of the variable buffer resistors $R_{11}, R_{12}, \ldots, R_{32}, R_{33}$ may cause adverse side effects. For example, if the buffer resistors $R_{13}$ associated with the shorted battery (or battery cells) $B_{14}$ has destructively formed an open circuit, while all the other buffer resistors $R_{11}, R_{12}, \ldots, R_{32}, R_{33}$ remain at a very low resistance. Batteries (or battery cells) $B_{23}$ in series with $B_{24}$, and $B_{33}$ in series with $B_{34}$ will overcharge battery cell $B_{13}$ and over-discharge themselves. This is more serious than in a conventional series-parallel scheme, because the voltage ratio of overcharge is 2:1 instead of 4:3. In various embodiments, this problem is eliminated by all the variable buffer resistors $R_{11}, R_{12}, \ldots, R_{32}, R_{33}$ on the same string or column are made to change synchronously. For example, the buffer resistors $R_{11}, R_{21}, R_{31}$, buffer resistors $R_{12}, R_{22}, R_{32}$, and buffer resistor $R_{13}, R_{23}, R_{33}$ are on the same string and are thermally coupled such that their temperatures rise and fall together. This causes their resistances to all change in unison. This coupling of the buffer resistors $R_{11}, R_{12}, \ldots, R_{32}, R_{33}$ that are on the same string effectively prevents overcharging and/or over-discharging during internal short, especially if the battery consists of long strings of battery cells on each string of batteries (or battery cells) $B_{11}, B_{12}, \ldots, B_{33}, B_{34}$.

Figure 2A:
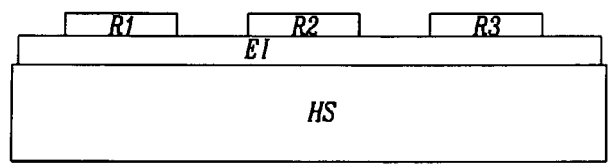
FIGS. 2a and 2b are drawings of a side view and a top view of an embodiment of an assembly of buffer resistors embodying the principles of the present invention.
Figure 2B:
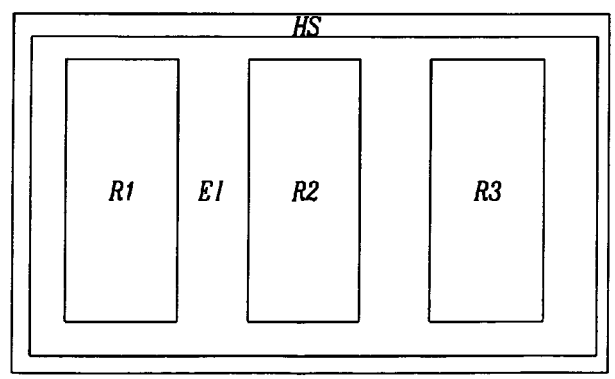

FIGS. 2a and 2b are drawings of a side view and a top view of an embodiment of an assembly for a thermally coupled string of buffer resistors $R_{11}, R_{12}, \ldots, R_{32}, R_{33}$. The buffer resistors $R_1$, $R_2$, and $R_3$ on the same string are disposed upon a common heat sink HS. The buffer resistors $R_1$, $R_2$, and $R_3$ are separated from the heat sink HS by an electrical insulator ES. For example, a thin film of plastic, such as polyimide, may be coated on the heat sink to form desired electrical insulator ES. Then multiple strips of PTC may be laid upon the ES to form desired buffer resistors. The plastic film may be reinforced with fiberglass or alumina powder to improve heat endurance.

In various embodiments, heat sink HS is a metal such as copper, aluminum, lead, tin or any other suitable heat conductor that is adequate to maintain substantially uniform temperature among the buffer resistors $R_1$, $R_2$, and $R_3$ on the same string. The thermal capacity of the heat sink HS is designed such that buffer resistors $R_1$, $R_2$, and $R_3$ associated with a shorted cell will heat up the heat sink, hence all buffer resistors on the heat sink, within a predetermined delay. The buffer resistors $R_1$, $R_2$, and $R_3$ associated with each column or string of batteries $B_{11}, B_{12}, \ldots, B_{33}, B_{44}$ has its own heat sink HS.

Figure 3:
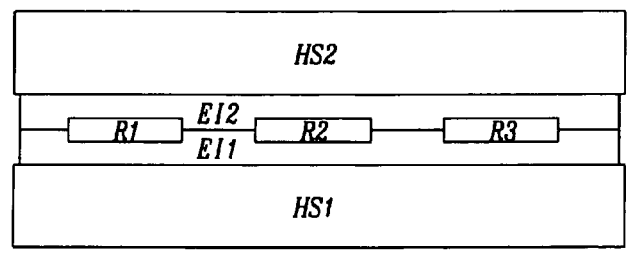
FIG. 3 is a drawing of a side view of another embodiment of an assembly of buffer resistors embodying the principles of the present invention.

FIG. 3 is a drawing of a side view of another embodiment of an assembly of buffer resistors $R_1$, $R_2$, and $R_3$ that ensures uniform temperature rise of the buffer resistors $R_1$, $R_2$, and $R_3$ within a string of the buffer resistors $R_1$, $R_2$, and $R_3$ associated with a shorted battery $B_{11}, B_{12}, \ldots, B_{33}, B_{34}$. In various embodiments, the buffer resistors $R_1$, $R_2$, and $R_3$ are placed on a first heat sink HS1 with a first electrical insulator E11 adhered to the first heat sink HS1. The buffer resistors $R_1$, $R_2$, and $R_3$ are formed on the first electrical insulator EI1. A second electrical insulator E12 is adhered to a second heat sink HS2. The second heat sink HS2 with the disposed second electrical insulator E12 is placed on the first heat sink HS1 such that the buffer resistors $R_1$, $R_2$, and $R_3$ are enclosed to insure more complete thermal coupling of the buffer resistors $R_1$, $R_2$, and $R_3$. The thermal coupling of the buffer resistors $R_1$, $R_2$, and $R_3$ causes their temperatures rise and fall together and cause their resistances to all change in unison. This coupling of the buffer resistors $R_1$, $R_2$, and $R_3$ that are connected to the same column or string of batteries $B_{11}$, $B_{12}$, ..., $B_{33}$, $B_{34}$ effectively prevents overcharging and/or over-discharging during internal short. However, the inrush current can be large enough to be of concern, even if all buffer resistors $R_1$, $R_2$, and $R_3$ are effectively open. This is true especially if the battery pack 100 of FIG. 1 consists of short column or string of batteries $B_{11}$, $B_{12}$, ..., $B_{33}$, $B_{44}$. The inrush current may pass through the largest loop, i.e., through the positive terminal T+ and the negative terminal T− of the battery pack 100. In this case, it is desirable that a current regulating element be placed in series with each column or string of batteries $B_{11}$, $B_{12}$, ..., $B_{33}$, $B_{34}$.

Figure 4:
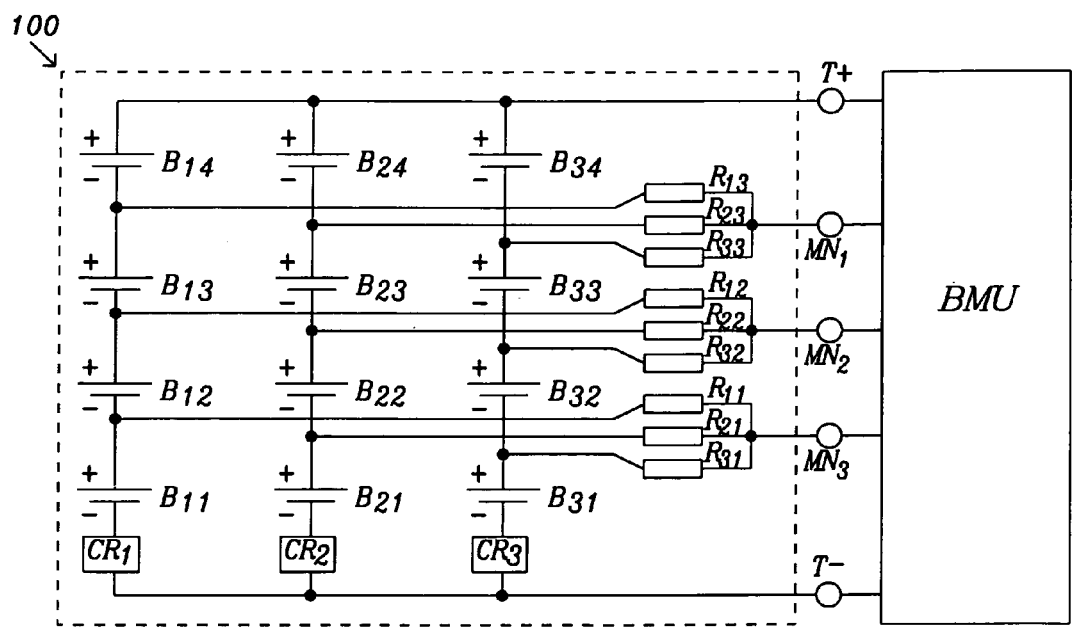
FIG. 4 is a schematic diagram of an embodiment of a battery pack coupled to the measurement nodes of a battery management unit (BMU), where the battery pack has a current regulating unit embodying the principles of the present invention.

FIG. 4 is a schematic diagram of an embodiment of a battery pack 100 coupled to the measurement nodes of a battery management unit BMU, where the battery pack 200 has current regulating units $CR_1$, $CR_2$, $CR_3$ embodying the principles of the present invention. Each column of the batteries $B_{11}$, $B_{12}$, ..., $B_{33}$, $B_{34}$ has a current regulating unit $CR_1$, $CR_2$, $CR_3$ in series with column or string of batteries $B_{11}$, $B_{12}$, ..., $B_{33}$, $B_{34}$ on the column. Although current regulating units $CR_1$, $CR_2$, $CR_3$, as shown, are connected between the negative terminal T− of the battery pack 200 and rows of the batteries or strings of battery cells $B_{11}$, $B_{12}$, ..., $B_{33}$, $B_{34}$, it should be noted that the current regulating units $CR_1$, $CR_2$, $CR_3$ may be inserted anywhere in the series of the batteries or strings of battery cells $B_{11}$, $B_{12}$, ..., $B_{33}$, $B_{34}$. In various embodiments, the current regulating units $CR_1$, $CR_2$, $CR_3$ are variable resistors, which may be adjusted manually during assembly and maintenance, or controlled automatically during application. The current regulating unit $CR_1$, $CR_2$, $CR_3$ are, in other embodiments, constructed of one or more of the following elements:

1. a switch, relay, or contact, which is inexpensive, yet useful in diagnostics, and allows a battery pack to work at reduced capacity, in case one series fails.
2. a fuse that can be activated by either temperature or current, where the fuse may or may not be able to be reset. A fuse protects the column or string of batteries $B_{11}$, $B_{12}$, ..., $B_{33}$, $B_{34}$ from overload, or operating at excessively high temperature.
3. a positive thermal coefficient resistance device in which resistance increases monotonically, reversibly, and non-linearly with temperature. A positive thermal coefficient resistance device may offset the negative thermal coefficient of cell internal resistance, thus reducing the sensitivity of current distribution to thermal gradient within the battery pack. A positive thermal coefficient resistance device also functions as a thermal fuse that can be restored.
4. a low-resistance adjustable resistor, for example a strip of conductor whose resistance may be decreased by adding a conductor in parallel (e.g., adding solder on the surface of strip, or soldering additional conductor to the strip), and increased by blocking the conductive path (e.g., punching a hole on the strip, or cutting off a portion of the strip). It is useful during assembly and maintenance.
5. a current regulator circuit.
6. an electronic switch (e.g. a CMOS device), which may be used to control current distribution by feedback control. Any design and construction of the current regulating units $CR_1$, $CR_2$, $CR_3$ that performs the function of preventing a large inrush current from each of the column or string of batteries $B_{11}$, $B_{12}$, ..., $B_{33}$, $B_{34}$ is in keeping with the principles of the present invention.

The current regulating unit $CR_1$, $CR_2$, $CR_3$ must be extremely reliable. A single failure may open a series column string of the batteries or battery cells $B_{11}$, $B_{12}$, ..., $B_{33}$, $B_{34}$ and divert its share of current onto other series column strings of the batteries or battery cells $B_{11}$, $B_{12}$, ..., $B_{33}$, $B_{34}$ thus overloading them. Current regulating units $CR_1$, $CR_2$, $CR_3$ must also exhibit low power loss and heat generation. Efforts should be made to reduce or eliminate the need for unreliable or heat generating components.

Figure 5:
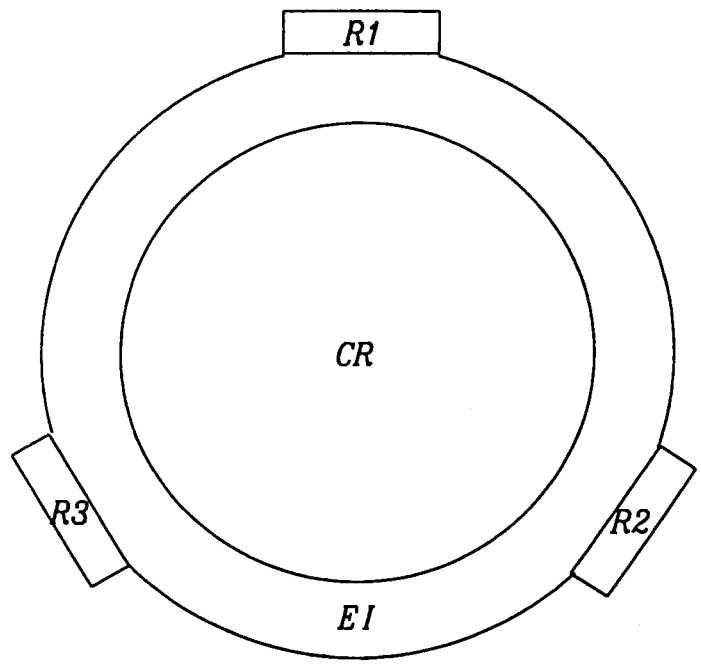
FIG. 5 is a drawing of a side view of another embodiment of an assembly of buffer resistors and a current regulating element embodying the principles of the present invention.

FIG. 5 is a drawing of a cross-section of another embodiment of an assembly of buffer resistors $R_1$, $R_2$, and $R_3$ and a current regulating unit CR embodying the principles of the present invention. The buffer resistors $R_1$, $R_2$, and $R_3$ are disposed on an electrical insulator EI that is adhered to the current regulating unit CR. In various embodiments the current regulating unit CR is a positive thermal coefficient resistance device.

Figure 6:
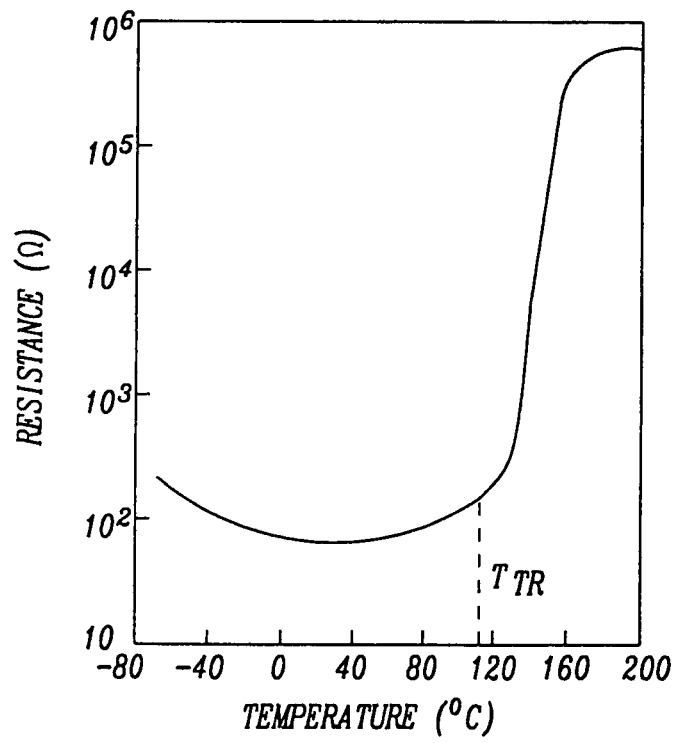
FIG. 6 is a plot of resistance of positive thermal coefficient resistance devices embodying the principles of the present invention versus temperature.

FIG. 6 is a plot of resistance of positive thermal coefficient resistance devices embodying the principles of the present invention versus temperature. Under normal operating conditions, the heat generated by charging/discharging current through the current regulating unit CR and inter-string spontaneously equalizing current are insufficient to raise the temperature of the assembly of buffer resistors $R_1$, $R_2$, and $R_3$ and a current regulating unit CR beyond the transition temperature of current regulating unit CR. Therefore power dissipation is low, and intra-bank equalization is efficient. However when an internal short creates excessive inrush current, the positive thermal coefficient resistance device of the current regulating unit CR and of the buffer resistors $R_1$, $R_2$, and $R_3$ together generate enough heat, to raise the temperature above transition temperature. Inrush current of the assembly of buffer resistors $R_{11}$, $R_{21}$, $R_{31}$, and a current, regulating unit CR is effectively suppressed in all paths preventing short-induced overcharging and over-discharging, especially if the battery pack 200 matrix of batteries or strings of battery cells $B_{11}$, $B_{12}$, ..., $B_{33}$, $B_{34}$ consists of short strings, i.e., series of few cells.

Figure 7:
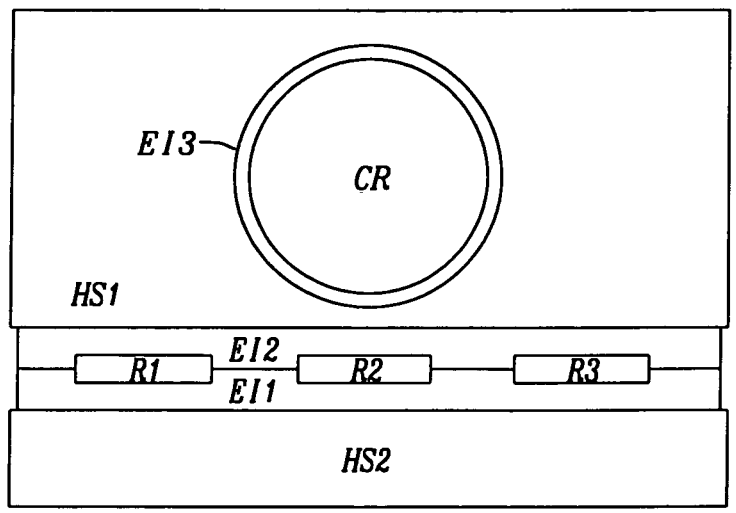
FIG. 7 is a drawing of a top view of another embodiment of an assembly of buffer resistors embodying the principles of the present invention.

FIG. 7 is a drawing of a cross-section of another embodiment of an assembly of buffer resistors $R_{11}$, $R_{21}$, $R_{31}$ and a current regulating unit CR to ensure uniform temperature rise of the buffer resistors $R_1$, $R_2$, and $R_3$ and the current regulating unit CR within a column or string of batteries $B_{11}$, $B_{12}$, ..., $B_{33}$, $B_{34}$ associated with a shorted battery. In various embodiments, the buffer resistors $R_1$, $R_2$, and $R_3$ are disposed on a first electrical insulator EI1 that is adhered to the first heat sink HS1. An opening is formed in the first heat sink HS1 to accept the current regulating unit CR. The current regulating unit CR is secured to the first heat sink HS1 with an electrical insulator EI3 that electrically isolates the current regulating unit CR from the heat sink HS.

A second electrical insulator EI2 is adhered to a second heat sink HS2. The second heat sink HS2 with the disposed second electrical insulator EI2 is placed on the first heat sink HS1 such that the buffer resistors $R_1$, $R_2$, and $R_3$ are enclosed to insure more complete thermal coupling of the buffer resistors $R_1$, $R_2$, and $R_3$ and the current regulating unit CR. The thermal coupling of the buffer resistors $R_1$, $R_2$, and $R_3$ and the current regulating unit CR causes their temperatures to rise and fall together and cause their resistances to all change in unison. This coupling of the buffer resistors $R_1$, $R_2$, and $R_3$ and the current regulating unit CR that are on the same string effectively prevents overcharging and/or over-discharging during internal short.

Figure 8:
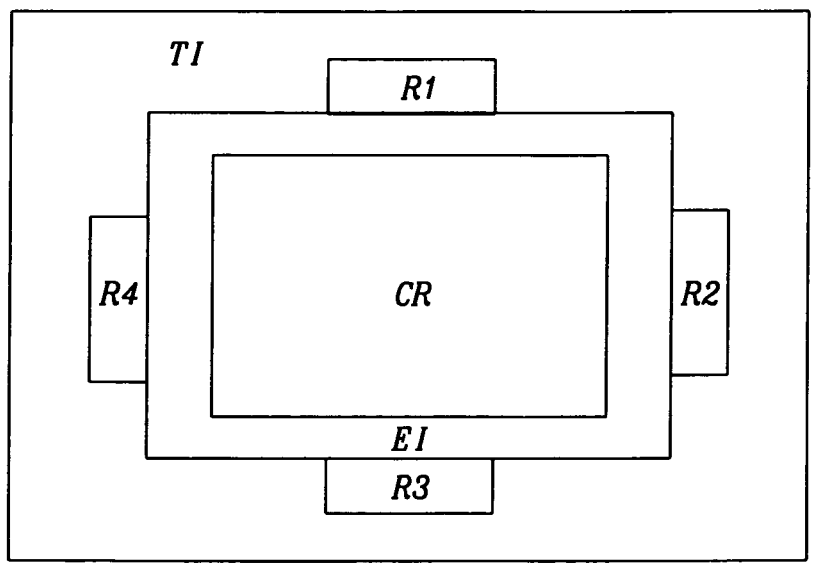
FIG. 8 is a drawing of a side view of another embodiment of an assembly of buffer resistors embodying the principles of the present invention.

FIG. 8 is a drawing of a cross-section of another embodiment of an assembly of buffer resistors $R_1$, $R_2$, $R_3$, and $R_4$ and a current regulating unit CR embodying the principles of the present invention. To further improve the thermal control of the assembly of buffer resistors $R_1$, $R_2$, $R_3$, and $R_4$ and a current regulating unit CR, the assembly of buffer resistors $R_1$, $R_2$, $R_3$, and $R_4$ and a current regulating unit CR are insulated from the ambient temperature of the atmosphere in which the battery pack 200 of FIG. 4 resides. The current regulating unit CR is shown as having a rectangular cross-section, and its four sides accommodate up to four buffer resistors. In embodiments having three resistors $R_1$, $R_2$, and $R_3$, as shown in series-parallel battery packs described above, the fourth resistor $R_4$ is not used. More generally, the current regulating unit CR is not necessarily rectangular, and (depending on the number of batteries in each series) any number of buffer resistors can be attached to its side walls. In case each series in the pack 200 has less than four buffer resistors, some of the sites for buffer resistors can be vacant. The assembly of buffer resistors $R_1$, $R_2$, $R_3$, and $R_4$ and a current regulating unit CR has the buffer resistors $R_1$, $R_2$, $R_3$, and $R_4$ disposed on the electrical insulation EI. The electrical insulation EI with the buffer resistors $R_1$, $R_2$, $R_3$, and $R_4$ are secured to the current regulating unit CR to thermally couple the current regulating unit CR to the buffer resistors $R_1$, $R_2$, $R_3$, and $R_4$. This entire construction is there encased in a thermal insulation that isolates the assembly of buffer resistors $R_1$, $R_2$, $R_3$, and $R_4$ and a current regulating unit CR from the ambient. The structure of the thermal insulation TI and the thermal mass of the buffer resistors $R_1$, $R_2$, $R_3$, and $R_4$ and the current regulating unit CR are designed to the desired activating temperature (temperature at which the buffer resistance increases sharply) and latency (from the rise of inrush current to increase in buffer resistance). While not shown, any of the heat sink structures above described may be included in the assembly of buffer resistors $R_1$, $R_2$, $R_3$, and $R_4$ and a current regulating unit CR and be in keeping with the principles of this invention.

While this invention has been particularly shown and described with reference to the preferred embodiments thereof, it will be understood by those skilled in the art that various changes in form and details may be made without departing from the spirit and scope of the invention.

The invention claimed is:

1. A current buffer assembly for limiting inrush current within a battery pack comprising a matrix of series-parallel connected battery cells, the current buffer assembly comprising:
    a plurality of current limiting devices wherein each of the plurality of current limiting devices has a first terminal connected to a junction of two adjacent battery cells on one column of the matrix of the series-parallel connected batteries and a second terminal connected such that the second terminals of the plurality of current limiting devices coupled to one row of the series-parallel connected batteries are commonly connected and coupled to one measurement terminal of a plurality of measurement terminals of a battery management unit of the battery pack;
    a plurality of current regulating elements wherein each current regulating element of the plurality of current regulating elements is in series with the battery cells of one column of the matrix of series-parallel connected battery cells for preventing a large inrush current to the column of the battery cells on which the current regulating element is disposed; and
    a plurality of heat sinks, wherein each of the plurality of heat sinks is thermally connected to the current limiting devices and the current regulating element coupled to one column of the series-parallel connected batteries such that the increased temperature resulting from increased current from a shorted battery cell increases the temperature of each of the plurality of current limiting devices and the current regulating element coupled to one column of the series-parallel connected batteries for limiting an inrush current from parallel neighbor battery cells of the matrix of series-parallel connected battery cells for preventing overcharging or over-discharging the battery cells within the matrix of series-parallel connected battery cells when one battery cell on the column shorts.

2. The current buffer assembly of claim 1 wherein the current limiting devices are buffer resistors.

3. The current buffer assembly of claim 2 wherein the buffer resistors are positive temperature coefficient buffer resistors.

4. The current buffer assembly of claim 1 wherein the battery management unit is configured for monitoring and balancing voltage between successive measurement terminals of the plurality of measurement terminals and a positive terminal and a negative terminal of the battery pack.

5. The current buffer assembly of claim 3 wherein the heat sink thermally connects the buffer resistors together coupled to the one column of the battery pack such that the buffer resistors increase in resistance resulting from a temperature increase caused by current flowing through the buffer resistor coupled to the shorted battery cell.

6. The current buffer assembly of claim 5 wherein the heat sink is copper, aluminum, tin, lead or other heat conducting material.

7. The current buffer assembly of claim 1 wherein each of the current regulating elements have a positive temperature coefficient to limit the inrush current when a battery cell on the column on which the current regulating resistor is disposed is shorted.

8. The current buffer assembly of claim 7 wherein each of the current regulating elements is a variable resistor, switch, relay, contact, a fuse, a current regulator circuit, or an electronic switch.

9. The current buffer assembly of claim 8 wherein the current regulating elements that are variable resistors are positive temperature coefficient buffer resistors.

10. The current buffer assembly of claim 9 wherein the current regulating elements that are positive temperature coefficient buffer resistors are thermally connected to the current limiting devices connected to the battery cells of each column.

11. The current buffer assembly of claim 1 further comprising a plurality of thermal insulation means, wherein one thermal insulation means is configured for encasing the plurality of current limiting devices, the current regulating element, and the heat sink on one column of the matrix of series-parallel connected battery cells to isolate the plurality of current limiting devices and the heat sink from the ambient temperature to ensure thermal tracking of the current limiting devices coupled to the column of battery cells containing the shorted battery cell.

12. A battery pack comprising:
    a matrix of rows and columns of series-parallel connected battery cells;
    a battery management unit in communication a with a positive terminal and a negative terminal of the series-parallel connected battery cells and in communication with junctions between pairs of the battery cells of each row of the series-parallel connected battery cells and configured for monitoring and balancing voltage between successive measurement terminals of the plurality of measurement terminals and a positive terminal and a negative terminal of the battery pack;

an inrush current limiting circuit for limiting inrush current within the battery pack resulting from shorting of at least one of the series-parallel connected battery cells, comprising:

a plurality of current limiting devices wherein each of the plurality of current limiting devices has a first terminal connected to a junction of two adjacent battery cells on one column of the matrix of the series-parallel connected batteries and a second terminal connected such that the second terminals of the plurality of current limiting devices coupled to the battery cells of two adjacent rows are commonly connected and coupled to one measurement terminal of the plurality of measurement terminals of the battery management unit;

a plurality of current regulating elements wherein each current regulating element of the plurality of current regulating elements is in series with the battery cells of one column of the matrix of series-parallel connected battery cells for preventing a large inrush current to the column of the battery cells on which the current regulating element is disposed; and a plurality of heat sinks, wherein each of the plurality of heat sinks is thermally connected to the current limiting devices and the current regulating element coupled to one column of the series-parallel connected batteries such that the increased temperature resulting from increased current from a shorted battery cell increases the temperature of each of the plurality of current limiting devices and the current regulating element coupled to the one column of the series-parallel connected batteries for limiting an inrush current from parallel neighbor battery cells of the matrix of series-parallel connected battery cells for preventing overcharging or over-discharging the battery cells within the matrix of series-parallel connected battery cells when one battery cell on the column shorts.

13. The battery pack of claim 12 wherein the current limiting devices and the current regulating element are buffer resistors.

14. The battery pack of claim 13 wherein the buffer resistors are positive temperature coefficient buffer resistors.

15. The battery pack of claim 14 wherein the heat sink thermally connects the buffer resistors together such that the buffer resistors increase in resistance resulting from a temperature increase caused by current flowing through the buffer resistor coupled to the shorted battery cell.

16. The battery pack of claim 15 wherein the heat sink is copper, aluminum, tin, lead or other heat conducting material.

17. The battery pack of claim 12 wherein each of the current regulating elements have a positive temperature coefficient to limit an inrush current when a battery cell on the column on which the current regulating resistor is disposed is shorted.

18. The battery pack of claim 17 wherein each of the current regulating elements is a variable resistor, switch, relay, contact, a fuse, a current regulator circuit, or an electronic switch.

19. The battery pack of claim 12 wherein the current regulating elements that are variable resistors are positive temperature coefficient buffer resistors.

20. The battery pack of claim 19 wherein the positive temperature coefficient buffer resistors are thermally connected to the current limiting devices connected to the battery cells of each column.

21. The battery pack of claim 12 wherein the current buffer assembly further comprises a plurality thermal insulation means, wherein one thermal insulation means is configured for encasing the plurality of current limiting devices, the current regulating element, and the heat sink on one column of the matrix of series-parallel connected battery cells to isolate the plurality of current limiting devices and the plurality of current limiting tracking means from the ambient temperature to ensure thermal tracking of the current limiting devices coupled to the column of battery cells containing the shorted battery cell.

22. A method for limiting inrush current within a battery pack comprising a matrix of series-parallel connected battery cells, the method for limiting inrush current comprising:

providing a plurality of current limiting devices;

connecting each of the plurality of current limiting devices to a first terminal connected to a junction of two adjacent battery cells on one column of the matrix of the series-parallel connected batteries;

commonly connecting a second terminal of the plurality of current limiting devices coupled to one row of the series-parallel connected batteries;

coupling the commonly connected second terminals of the plurality of current limiting devices coupled to one row of the series parallel connected batteries to one measurement terminal of the plurality of measurement terminals of a battery management unit;

providing a plurality of current regulating elements;

arranging each current regulating element of the plurality of current regulating elements in series with the battery cells of one column of the matrix of series-parallel connected battery cells for preventing a large inrush current to the column of the battery cells on which the current regulating element is disposed;

providing a plurality of heat sinks;

connecting each of the plurality of heat sinks thermally to the current limiting devices and the current regulating element coupled to one column of the series-parallel connected batteries such that the increased temperature resulting from increased current from a shorted battery cell increases the temperature of each of the plurality of current limiting devices coupled to one column of the series-parallel connected batteries equalizes the current limiting of each of the battery cells of the column for limiting an inrush current from parallel neighbor battery cells of the matrix of series-parallel connected battery cells from overcharging the battery cells on the column having the shorted cell and over-discharging the parallel neighbor battery cells within the matrix of series-parallel connected battery cells when one battery cell on the column shorts.

23. The method for limiting inrush current of claim 22 wherein the current limiting devices are buffer resistors.

24. The method for limiting inrush current of claim 23 wherein the buffer resistors are positive temperature coefficient buffer resistors.

25. The method for limiting inrush current of claim 22 wherein the heat sink is copper, aluminum, tin, lead or other heat conducting material.

26. The method for limiting inrush current of claim 22 wherein each of the current regulating elements have a positive temperature coefficient to limit an inrush current when a battery cell on the column on which the current regulating resistor is disposed is shorted.

27. The method for limiting inrush current of claim 26 wherein each of the current regulating elements is a variable resistor, switch, relay, contact, a fuse, a current, regulator circuit, or an electronic switch.

28. The method for limiting inrush current of claim 22 wherein coupling each of the current regulating elements to the heat sinks causes the current limiting of the current regulating element on the one column to limit the inrush current from parallel neighbor battery cells of the matrix of series-parallel connected battery cells for preventing overcharging the battery cells on the column having the shorted cell and over-discharging the parallel neighbor battery cells within the matrix of series-parallel connected battery cells when one battery cell on the column shorts.

29. The method for limiting inrush current of claim 28 wherein the current regulating elements that are variable resistors are positive temperature coefficient buffer resistors.

30. The method for limiting inrush current of claim 29 wherein the current regulating elements that are positive temperature coefficient buffer resistors are thermally connected to the current limiting devices connected to the battery cells of each column.

31. The method for limiting inrush current of claim 22 wherein the heat sink is copper, aluminum, tin, lead or other heat conducting material.

32. The method of for limiting inrush current of claim 22 further comprising the steps of:
forming a plurality of thermal insulation means
configuring each thermal insulation means for encasing the plurality of current limiting devices, the current regulating element, and the heat sink on one column of the matrix of series-parallel connected battery cells to isolate the plurality of current limiting devices and the heat sink from the ambient temperature to ensure thermal tracking of the current limiting devices coupled to the column of battery cells containing the shorted battery cell.

* * * * *